United States Patent Office 2,822,948
Patented Feb. 11, 1958

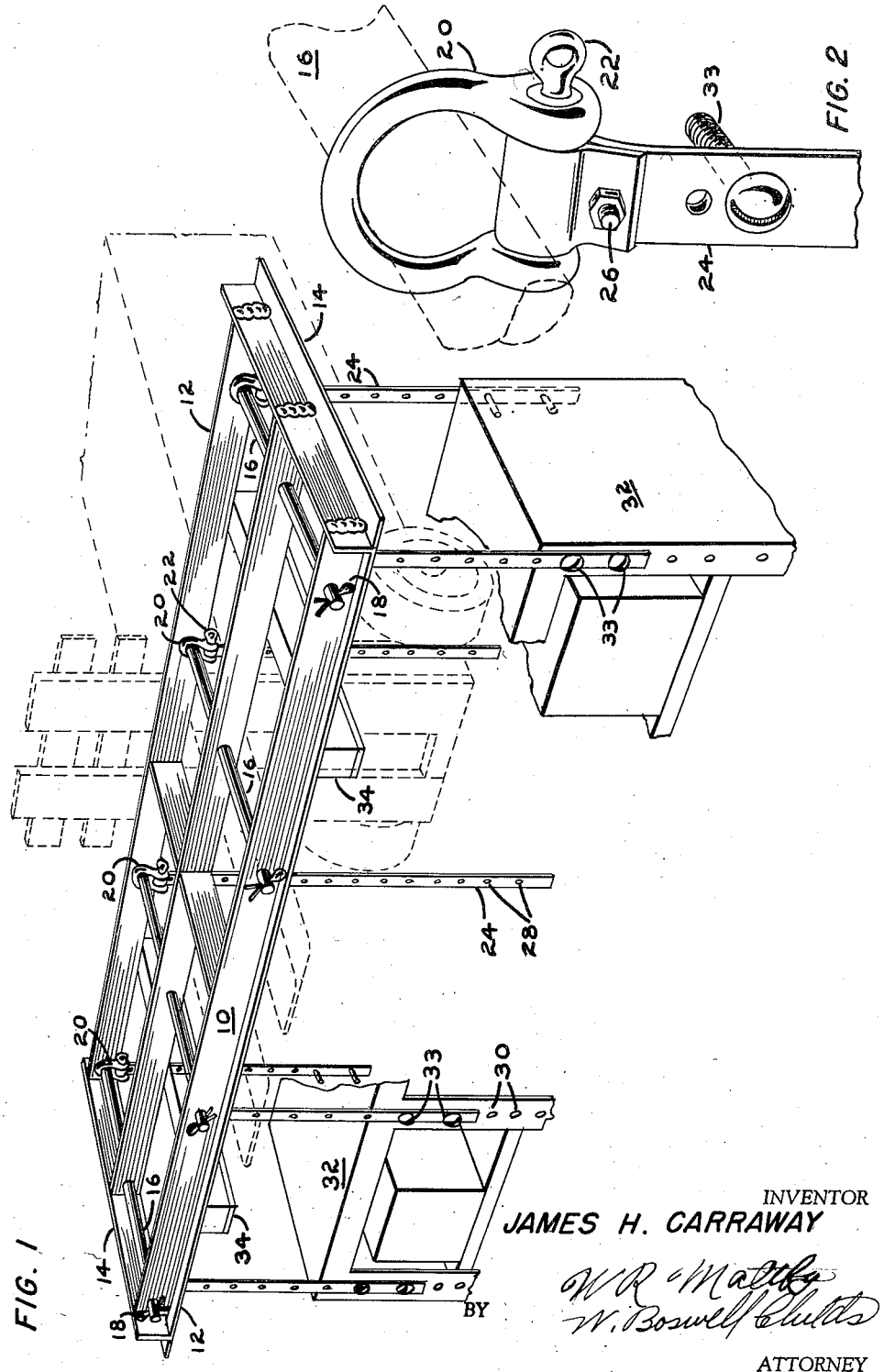
INVENTOR
JAMES H. CARRAWAY

2,822,948

BIN LIFTING DEVICE

James Harvey Carraway, Norfolk, Va.

Application April 5, 1957, Serial No. 651,114

1 Claim. (Cl. 214—621)

(Granted under Title 35, U. S. Code (1952), sec. 266)

The invention described herein may be manufactured and used by or for the Government of the United States of America for governmental purposes without the payment of any royalties thereon or therefor.

The present invention relates to a bin lifting device to facilitate the movement of loaded storage bins. More specifically, the present invention is a device suitable for attachment to a storage bin to permit the lifting and movement of the bin by means of a fork lift truck.

In many warehouses, materials are separated into various types and sizes and stored in sheet steel bins. Many of the bins used are of the type consisting of a sheet steel back and two sides, with steel shelves bolted to the back and sides, wherein the positions of the shelves are made adjustable, in order to accommodate the various sizes of the stores. This is done by providing the front, back and sides of the bins with vertical rows of holes, each row corresponding to a bolt hole in the shelf. The bins are often also bolted together back to back and side by side in groups to make them more sturdy.

When movement of the stores from one warehouse to another or rearrangement of the stock within the same warehouse is desired, it has previously been the practice to remove the stock from the storage bins and move the bins and stock separately. This has been necessary because it has not been practical to move the loaded bins since there is no convenient place for a group of men to grasp a loaded storage bin to lift it. If the bin were tipped up on edge to roll a dolly under, the edge might crumble since the sheet steel bins are designed to rest flat on the bottom. Tipping the bins would also disarrange and possibly damage the stores and require them to be handled anyhow. Furthermore, if the bins were bolted together in groups it would often be necessary to remove the stores in order to unbolt and separate the sections to move them. However, the removal and replacement of the stores had the disadvantage of requiring a considerable expenditure of time and manpower.

An object of the present invention is to permit the lifting of a storage bin without the removal of its contents.

Another object of the invention is to enable a storage bin to be moved without disturbing the material stored therein.

A third object of the invention is to permit a loaded storage bin to be lifted and moved by a standard fork lift truck.

Another object of the invention is to enable the movement of loaded storage bins without damage to the bin or its contents.

A further object of the invention is to allow the simultaneous movement of a number of storage bins which have been bolted together.

Still another object of the invention is to permit the lifting and movement of storage bins with a minimum expenditure of manpower.

Further objects of the invention will be apparent from the description of the invention in connection with the drawing, which shows a preferred embodiment of the invention.

Fig. 1 shows an isometric view of a bin lifting device;
Fig. 2 shows a detail of the shackle and strap assembly.

The bin lifting device comprises a rectangular frame 10 having two side pieces 12 and two end pieces 14. These pieces are shown to be constructed of angle iron, but may be made of any suitable material such as wooden beams, etc. The side pieces are rigidly fastened to the end pieces by welding, bolting, or other means.

A plurality of steel rods 16 pass through holes in side pieces 12 and are held in position by cotter pins 18. On each of the rods 16 are two shackles 20 having pins 22. Steel straps 24 each have their top end bent to form a loop over a shackle pin, the free end being held down with bolts 26. The bottom ends of straps 24 have holes 28 of approximately the same size and spacing as holes 30 in the front of bins 32 so that they may be bolted thereto by bolts 33. Rectangular frame 10 is made to have inside dimensions between side pieces 12 slightly greater than twice the depth of the largest single storage bin to be moved. The spaces between rods 16 are approximately equal to the width of the storage bins. Frame 10 is also provided with skids 34 fastened between side pieces 12 on the under side thereof.

In operation, the bin lifting device is placed on top of the bin or group of bins which are desired to be moved, by means of a fork lift truck. The frame rests on skids 34 on top of the bins 32 while straps 24 are bolted to the bins, so that the fork lift truck may be used for other purposes during this time. The shackles permit the positions of straps 24 to be adjusted along rods 16 and the several rods permit the use of the device with groups of storage bins which have been bolted together back to back and side to side, since the widths of the bins are ordinarily uniform. The device will accommodate any depths and groupings.

After the straps have been bolted to the bins, the fork lift truck may insert its forks beneath the frame 10 in the space provided by skids 34 and lift the whole assembly unitarily. The group of bins are lifted vertically, so as not to disturb their contents, and may be carried to the desired location by the fork lift truck or placed on a dolly or flat bed trailer for this purpose. The whole operation may be accomplished expeditiously with a minimum expenditure of time and manpower.

Obviously many modifications and variations of the present invention are possible in the light of the above teachings. For instance, the straps may be provided with hooks to engage the bins in place of bolt holes 28, the rods 16 may be fastened to the frame by other means than that shown, or the straps may be attached to the rods by means other than shackles. It should be understood that it is intended to cover all changes and modifications of the preferred embodiment disclosed which do not constitute departures from the spirit and scope of the invention.

Having thus described the invention, I claim:

A bin lifting device comprising a rigid rectangular frame, a plurality of rods extending traversely across said frame and fastened thereto, a pair of straps connected to each of said rods, means associated with each strap for attaching same to a storage bin, and a pair of skids extending transversely across the bottom of said frame.

References Cited in the file of this patent

UNITED STATES PATENTS

| | | |
|---|---|---|
| 2,662,710 | Lapham | Dec. 15, 1953 |
| 2,696,317 | Toffolon | Dec. 7, 1954 |
| 2,707,573 | Balwics | May 3, 1955 |
| 2,764,307 | Kughler | Sept. 25, 1956 |